United States Patent [19]

Domingo

[11] Patent Number: 5,611,818
[45] Date of Patent: Mar. 18, 1997

[54] DRY LEUCO SULPHUR DYES IN PARTICULATE FORM

[75] Inventor: Manuel J. Domingo, Barcelona, Spain

[73] Assignee: Sandoz Ltd., Basel, Switzerland

[21] Appl. No.: 156,340

[22] Filed: Nov. 22, 1993

Related U.S. Application Data

[63] Continuation-in-part of Ser. No. 887,513, May 22, 1992, abandoned.

[30] Foreign Application Priority Data

| May 23, 1991 | [GB] | United Kingdom | 9111194 |
| May 23, 1991 | [GB] | United Kingdom | 9111211 |
| Nov. 25, 1991 | [GB] | United Kingdom | 9124959 |
| Nov. 25, 1991 | [GB] | United Kingdom | 9124998 |
| Nov. 20, 1992 | [GB] | United Kingdom | 9224368 |

[51] Int. Cl.$^6$ .................. C09B 67/02; C09B 49/00
[52] U.S. Cl. .................. 8/524; 8/526; 8/607; 8/611; 8/608; 8/650; 8/651; 8/652
[58] Field of Search .................. 8/524, 526, 607, 8/608, 611, 651, 652

[56] References Cited

U.S. PATENT DOCUMENTS

| 1,095,237 | 5/1914 | Schmidt et al. | 8/652 X |
| 1,141,148 | 6/1915 | Schmidt et al. | 8/652 X |
| 2,122,113 | 6/1938 | Ratti | 8/651 X |
| 2,228,465 | 1/1941 | Laughlin | 8/652 X |
| 3,993,437 | 11/1976 | Dickmanns et al. | 8/652 X |
| 4,213,900 | 7/1980 | Daubach et al. | 260/208 |
| 4,252,533 | 2/1981 | Heid et al. | 8/652 X |
| 4,425,134 | 1/1984 | Bruttel et al. | 8/524 |
| 4,917,706 | 4/1990 | Meszaros | 8/652 |
| 4,950,306 | 8/1990 | Meszaros | 8/607 |
| 4,992,078 | 2/1991 | Meszaros | 8/444 |
| 5,030,244 | 7/1991 | Neumann et al. | 8/526 |
| 5,030,248 | 7/1991 | Meszaros | 8/652 |
| 5,053,078 | 10/1991 | Koike et al. | 106/22 |

FOREIGN PATENT DOCUMENTS

| 459281 | 1/1946 | Belgium . |
| 7273 | of 1906 | United Kingdom . |
| 12219 | of 1907 | United Kingdom . |
| 4510 | of 1912 | United Kingdom . |
| 27379 | of 1912 | United Kingdom . |
| 2201165 | 8/1988 | United Kingdom . |

OTHER PUBLICATIONS

Trotman, Dyeing and Chemical Technology of Textile Fibers, 1984, p. 404 No month available.

*Primary Examiner*—Margaret Einsmann
*Attorney, Agent, or Firm*—Robert S. Honor; Carl W. Battle; Thomas C. Doyle

[57] ABSTRACT

By reducing a sulphur dye (S) in aqueous medium with a reducing carbonyl compound in the presence of alkali metal hydroxide and optionally alkali metal (bi)sulphite at temperatures above 60° C. and drying the reaction mixture, there are obtained very stable leuco sulphur dyes (L), which are practically free of sulphides and polysulphides, are readily and completely soluble in water and are usable for the dyeing of substrates dyeable with sulphur dyes, by which a disturbing development of $H_2S$ or a disturbing inorganic sulphide occurrance in the waste water can be efficiently avoided; by spray-drying in a drying time <4 minutes as described there are obtained sulphide-free, stable leuco sulphur dyes (L) readily soluble in water and particularly suitable for sulphide-free dyeing, in particular for the dyeing of polyamidic fibrous substrates, especially of wool.

66 Claims, No Drawings

DRY LEUCO SULPHUR DYES IN PARTICULATE FORM

This is a continuation in part of patent application Ser. No. 887,513 filed on 22 May 1992 now abandoned.

For the dyeing of substrates (e.g. cellulosic substrates) with sulphur dyes these are suitably applied in their leuco form, i.e. in the form of dyes conventionally known as leuco sulphur dyes. These leuco sulphur dyes can be produced by reducing the corresponding sulphur dyes with reducing agents, in particular with sodium sulphide or with reducing sugars, e.g. with glucose, as described e.g. in published U.K. Patent Application GB 2 201 165 A. Since in the reduction of sulphur dyes to give leuco sulphur dyes there are formed inorganic (poly)sulphides (mainly $Na_2S$, $Na_2S_2$ and/or NaHS) and/or some sulphide in excess may be present, which constitute a disturbing component in the final product (as it may cause development of $H_2S$ when handling the dye or when dyeing with it, and/or results in the occurrence of inorganic sulphides in the back-water of the dyeings) it has been attempted to reduce as much as possible the inorganic sulphide content in the produced leuco sulphur dye and thus GB 2 201 165 A refers to a process for producing leuco sulphur dyes with a reduced sulphide content, in particular a sulphide content of about 1 to 14%. However, even if the inorganic sulphide content can be as low as about 1%, this may still constitute a source of $H_2S$ and may further increase on storage of the dye due to occasional decomposition by possible desulphurization of the oligosulphide bridges, which causes further formation of inorganic sulphide, which in turn is capable of producing the disturbing $H_2S$. Further, if these dyes are purified to an inorganic sulphide content of less than 1%, the dyes tend to oxidize in contact with air. This oxidation is favoured in the liquid form, so that on standing, in contact with air, there may be formed a disturbing film of oxidized product on the surface of liquid compositions of such dyes. Thus the liquid (in particular aqueous) forms of such dyes may oxidize resp. destabilize on storage rather soon, so as to discourage from commercializing them in this form or even from preparing in advance a stock solution to be stored and used as a stock for some time during dyeing. For such dyes a minimum of about 2–3% of inorganic sulphide is needed in order to substantially prevent oxidation as convenient for commercialization or even for storable stock solutions.

It has now been found that the amount of disturbing sulphide ions can be further reduced and a hydrosoluble leuco sulphur dye of high stability can be obtained, without having to use a reducing sulphide, if the sulphur dye is reduced in aqueous medium, in the presence of alkali metal hydroxide and preferably also of alkali metal (bi)sulphite, with a reducing carbonyl compound at high temperature, as indicated below, and the reaction mixture is directly dried, preferably at high temperature.

The invention relates to the new process, to the products of the process, to compositions containing said products and to the dyeing of substrates therewith.

The invention thus provides a process for the production of hydrosoluble dry leuco sulphur dyes (L) wherein a sulphur dye (S) is reacted in aqueous medium and at a temperature above 60° C. with an efficient amount of (A) a reducing carbonyl compound
in the presence of
(B) an alkali metal hydroxide,
and dried.

According to a particular feature of the invention the reaction of (S) with (A) is carried out also in the presence of an alkali metal sulphite and/or bisulphite. The invention thus provides also a process for the production of stabilized, hydrosoluble leuco sulphur dyes (L) wherein a sulphur dye (S) is reacted in aqueous medium at a temperature above 60° C. with an efficient amount of (A) in the presence of (B) and (C) an alkali metal sulphite and/or bisulphite
and dried.

As sulphur dyes (S) come in general into consideration conventional dyes known under this concept and as defined as "Sulphur Dyes" and "Sulphurized Vat Dyes" in VENKATARAMAN "The Chemistry of Synthetic Dyes" Vol. II (Chapters XXXV and XXXVI) (1952) and Vol. VII (1974) or as defined e.g. in the "Colour Index" as "Sulphur Dyes" and also as "Vat Dyes" with the further indication "sulphur", resp. with a structure number and a synthetic method involving a sulphurization. Essentially they are dyes that contain aromatically bound oligosulphide bridges that are reducible to thiol groups and may optionally be of oligomeric to polymeric structure. They are obtainable mainly by thionation of the respective intermediates at high temperature, e.g. above 100° C., in particular in the temperature range of 110°–300° C. (e.g. by baking or in the melt or in the presence of water and/or of an inert organic solvent).

The exact structure of sulphur dyes is mostly unknown or not completely known, even if the starting compounds are known, since e.g. the number and/or position of the oligosulphide bridges, the number of sulphur atoms in one oligosulphide bridge, the number of hetero rings and/or NH-bridges and/or the number of repeating monomeric units in the sulphur dye molecule may vary depending on the starting materials and synthetic conditions.

According to the invention there may be employed as (S) any sulphur dyes known to be reducible to corresponding leuco sulphur dyes, e.g. sulphur dyes and pre-reduced sulphur dyes known to lead to the following leuco sulphur dyes [Colour Index Leuco Sulphur denomination or Colour Index reduced Vat (sulphur) denomination]:

C.I. Leuco Sulphur Black 1, CAS: 66241-11-0
C.I. Leuco Sulphur Black 2, CAS: 101357-26-0
C.I. Leuco Sulphur Black 11, CAS: 90480-94-7
C.I. Leuco Sulphur Black 18, CAS: 90170-71-1
C.I. Leuco Sulphur Red 10, CAS: 1326-96-1
C.I. Leuco Sulphur Red 14, CAS: 68585-53-5
C.I. Leuco Sulphur Blue 3, CAS: 85566-77-4
C.I. Leuco Sulphur Blue 7, CAS: 69900-21-6
C.I. Leuco Sulphur Blue 11, CAS: 90480-94-7
C.I. Leuco Sulphur Blue 13, CAS: 12262-26-9
C.I. Leuco Sulphur Blue 15, CAS: 100208-97-7
C.I. Leuco Sulphur Blue 20, CAS: 85940-25-6
C.I. Reduced Vat Blue 43, CAS: 1327-79-3
C.I. Leuco Sulphur Green 2, CAS: 12262-32-7
C.I. Leuco Sulphur Green 16, CAS: 70892-38-5
C.I. Leuco Sulphur Green 35, CAS: 90170-23-3
C.I. Leuco Sulphur Green 36, CAS: 90295-17-3
C.I. Leuco Sulphur Brown 1, CAS: 1326-37-0
C.I. Leuco Sulphur Brown 3, CAS: 100208-66-0
C.I. Leuco Sulphur Brown 10, CAS: 12262-27-0
C.I. Leuco Sulphur Brown 21, CAS: 97467-78-2
C.I. Leuco Sulphur Brown 26, CAS: 71838-68-1
C.I. Leuco Sulphur Brown 31, CAS: 1327-11-3
C.I. Leuco Sulphur Brown 37, CAS: 70892-34-1
C.I. Leuco Sulphur Brown 52, CAS: 68511-02-4

C.I. Leuco Sulphur Brown 95, CAS: 90268-97-6
C.I. Leuco Sulphur Brown 96, CAS: 85736-99-8
C.I. Leuco Sulphur Orange 1, CAS: 1326-49-4
C.I. Leuco Sulphur Yellow 9, CAS: 85737-01-5
C.I. Leuco Sulphur Yellow 22, CAS: 90268-98-7 in particular the respective C.I. Sulphur Dyes or C.I. Vat (sulphur) Dyes—(respectively the corresponding starting materials, when the synthesis of the sulphur dye and its reduction according to the invention are carried out in one reaction sequence) and which by the process of the invention lead to the corresponding stabilized leuco form.

The sulphur dyes (S) are preferably employed in the form of an aqueous (S)-containing mass (P), in particular of an aqueous paste. The aqueous mass (P) may be produced e.g. by suspending in water a commercial sulphur dye or a sulphur dye produced by baking or in the melt, or preferably the aqueous mass (P) is the aqueous reaction mixture of the production of the sulphur dye in the presence of water or, according to a particularly preferred feature of the invention, an aqueous filter cake resulting from the filtration of an aqueous thionation reaction mixture, which thionation reaction mixture may previously have been precipitated e.g. by oxidation and/or acidification; or, according to a further particular feature of the invention, (P) is a reaction mixture obtained from the reaction steps of thionation, reduction with sulphide and re-precipitation of the dye by oxidation (e.g. with air), or a filter cake resulting from the filtration of such a reaction mixture.

The reducing agent (A) is preferably aliphatic and is suitably a carbonyl compound that contains in α-position to the carbonyl group a donor as a substituent; preferably the substituent in α-position to the carbonyl group is a hydroxy group, optionally etherified, in particular a methoxy group, or an amino group which may optionally be acetylated. As (A) come principally into consideration aliphatic compounds with 3 to 6 carbon atoms, in particular 1-hydroxy-acetone, carbohydrates with 3 to 6 carbon atoms and their derivatives in which one or more of the present hydroxy groups are etherified with methyl or replaced by an amino or acetylamino group, in particular aldo sugars and keto sugars and their oligomers and/or desoxy-derivatives and further their uronic acids. Preferred carbonyl compounds (A) may be represented by the following formulae

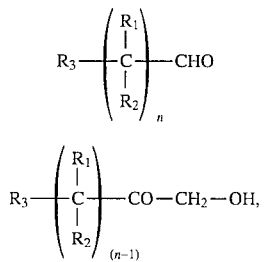

wherein the one of $R_1$ and $R_2$ signifies hydrogen and the other signifies —OH, —OCH$_3$ or —NH$_2$, $R_3$ signifies —CH$_3$, —CH$_2$OH, —CHO or —COOM, M signifies hydrogen or a cation and n signifies an integer from 1 to 5.

M is advantageously a colourless cation, preferably an alkali metal cation, more preferably sodium.

If in formula (I) n is an integer from 2 to 5 the n symbols $R_1$ may have, independently, the same significance or different significances and the n symbols $R_2$ may have, independently, the same significance or different significances. In formula (I) one of $R_1$ and $R_2$ is hydrogen and the other preferably is hydroxy; $R_3$ in formula (I) preferably signifies —CH$_2$OH, or if n signifies 2 to 5, also a carboxy group; n in formula (I) preferably signifies 3 or more preferably 4. If in formula (II) n signifies 3, 4 or 5 the (n−1) symbols $R_1$ may, independently from each other, have the same significance or different significances and the (n−1) symbols $R_2$ may, independently from each other, have the same significance or different significances. In formula (II) one of the two symbols $R_1$ and $R_2$ signifies hydrogen and the other preferably signifies hydroxy. If in formula (II) n signifies 1, $R_3$ preferably signifies —CH$_3$ or —CH$_2$OH; if in formula (II) n signifies 2, 3, 4 or 5, $R_3$ preferably signifies —CH$_2$OH. Of the compounds of formula (II) are preferred those in which n signifies 1, 3 or 4. The monosaccharides of formula (I) and of formula (II) may also be in the pyranoside or furanoside form; the uronic acids of formula (I) and of formula (II) may also be in the lactone form.

Representative reducing sugars are, in particular, aldo-pentoses, especially arabinose, ribose and xylose, and hexoses, especially glucose, fructose, mannose and galactose, and their desoxy, disdesoxy and aminodesoxy derivatives. As (A) there may also be employed oligosaccharides, in particular disaccharides, especially sucrose, lactose, maltose, melibiose and cellobiose, and tri-, tetra- and pentasaccharides, especially melezitose and raffinose, and further syrups, such as corn syrup, malt syrup and molasses, which contain reducing sugars. The preferred reducing sugar is glucose.

Suitably the quantity of (A) is chosen so as to suffice for the practically complete reduction of the employed sulphur dye (S). The required quantity of (A) and also the preferred quantity of (A) may vary depending on the sulphur dye, the synthetic method used for its production and the chosen compound (A). Advantageously (A) is employed in amounts of 1 to 40, preferably 5 to 15% by weight referred to the dry final product (L). Expressed with reference to the weight of active material, which here is the total amount of polymeric products obtained in the production of the sulphur dye (S), (A) is advantageously employed in amounts in the range of 1 to 80, preferably 5 to 40, more preferably 10 to 20% by weight. The suitable or, in particular, preferred quantity of (A) may be determined by means of a few preliminary tests.

As (B) there may be employed dry or preferably aqueous alkali metal hydroxide, in particular aqueous lithium hydroxide, sodium hydroxide or potassium hydroxide solutions, preferably sodium hydroxide solutions or potassium hydroxide solutions. (B) may be employed in the form of conventional aqueous solutions, in particular of a concentration of ≧10% by weight, preferably ≧20% by weight, advantageously of higher concentration, in order to keep the quantity of water to be evaporated and also the evaporation time to a minimum. Preferably (B) is employed in the form of aqueous 30 to 50% alkali metal hydroxide, in particular sodium hydroxide or potassium hydroxide. The reacted amount of (B) may vary not only with (S) but also with (A) and (C) and their relative quantities. The amount and concentration of alkali metal hydroxide is suitably chosen so that an excess of alkali metal hydroxide, i.e. some unreacted alkali metal hydroxide (B), is present in the dry final product (L), advantageously an excess of 0.5 to 20% by weight, preferably 3 to 10% by weight, referred to the weight of the dry final product (L). Expressed with reference to the weight of active material (as defined above) the excess amount of (B) advantageously is in the range of 1 to 40, preferably 5 to 20% by weight. The concentration of (B) in the reaction mixture is suitably so that the pH is above 12, preferably above 14. With particular preference the alkali metal hydroxide concentration in the reaction medium is such that it is present as a 1N to 12N solution, preferably 2.5N to 8N solution, with reference to the total of water present in the reaction mixture. In the aqueous concentrated alkali metal hydroxide solution the reducing sugars may form the so-called reductones.

As (C) there may be employed lithium, sodium or potassium sulphite or bisulphite or a mixture of two or more thereof, preferably sodium sulphite and/or most preferably sodium bisulphite. (C) is advantageously employed in amounts of 1 to 40, preferably 2 to 24, more preferably 5 to 10% by weight, referred to the weight of the dry stabilized product (L). Expressed with reference to the weight of active material (as defined above) (C) is advantageously employed in amounts in the range of 1 to 80, preferably 5 to 40, more preferably 10 to 20% by weight.

The weight ratio of (A)/(C) may vary broadly, in particular in the range of 1/10 to 10/1, advantageously 1/5 to 5/1, preferably 2/1 to 1/2, more preferably 1/1.5 to 1.5/1.

The total water content of the reaction mixture at the beginning of the reaction is conveniently at least such that the mixture is easily stirrable and the aqueous phase represents the continuous phase and is advantageously ≦95% by weight, preferably ≧8% by weight; it may vary depending on the employed reactants. Advantageously the water content of the reaction mixture at the beginning of the reaction is at least 10% by weight, in particular 10 to 90% by weight, preferably 20 to 80% by weight.

The water content of (P) may vary in a broad range, depending on its production, and may suitably be in the range of 5 to 95% by weight, preferably 10 to 90% by weight, referred to the total of (P). If (P) is a reaction mixture resulting from the thionation reaction in aqueous medium (and, depending on the dye, optionally precipitation by acidification and/or oxidation) for the production of the sulphur dye (S), it may be employed as such or may previously be filtered, the choice depending mainly on the water content, inorganic sulphides content and/or further salt content of the dye suspension, secondarily also on its filterability and further also on the concentration of the dried dye aimed at. Reaction mixtures with a water content >95% by weight or even >90% by weight are preferably subjected to filtration (if desired or if required in the presence of a filter aid). By filtration the water content may be substantially reduced and may range e.g. in the scope of 8 to 90% by weight in the filter cake, depending on the consistence of the suspended dye, on the filter system and on the presence of any filter aid. Preferably the water content of (P) is in the range of 20 to 80% by weight.

The reduction reaction is carried out at temperatures above 60° C., advantageously in the temperature range of 65° to 200° C., preferably 95° to 190° C. if required under superatmospheric pressure, particularly in the temperature range of 100° to 140° C. especially for long time reactions (i.e. of >1 hour, in particular 2 to 30 hours, optionally with at least partially simultaneous drying as described below) and higher temperature ranges, particularly 130° to 190° C., more preferably 145° to 190° C., for short time reactions as described below, especially with at least partially simultaneous drying (i.e. ≦1 hour, in particular 2 to 30 minutes resp. 4 to 30 minutes).

The reaction may be carried out with exclusion of oxygen, in particular of air, e.g. under a nitrogen blanket, or preferably without the exclusion of air. The reaction is suitably continued until reduction to the corresponding leuco form is practically complete, i.e. until the obtained reduction product is readily and completely soluble in water, with practically no insoluble non-reduced sulphur-dye residue—this can be assessed by a simple hydrosolubility test, e.g. by dissolving 5 g of reduction product in 95 g of demineralized water at room temperature (=20° C.) with stirring until the soluble product is completely dissolved to a 5% solution and then filtering through a paper filter "Schleicher & Schell" 589/2. A completely soluble product leaves no undissolved particles on the filter. That reduction is practically complete and the reduced product is readily soluble in water signifies that most or practically all of the oligosulphide bridges in the sulphur dye (in particular at least 95%, preferably 99 to 100%) are reduced. The process of the invention may be carried out in two stages, i.e. first the reduction reaction to obtain an aqueous akaline leuco sulphur dye solution and then the drying of the obtained solution, or preferably in one stage, i.e. the reduction reaction and the evaporation of the water (drying) are carried out simultaneously or in part simultaneously (i.e. the reduction reaction is completed during the drying). Similarly as the reduction reaction the drying may be carried out in the presence or in the absence of air, e.g. under a nitrogen blanket. Where the process is carried out in two stages, preferably at least one of the two stages, reduction reaction and drying, is carried out in the presence of air; most preferably as well the reduction reaction as the drying are carried out in the presence of air. The reaction time may vary broadly depending on the employed apparatus, the composition of the reaction mixture and the reaction parameters; it may range in particular in the scope of 2 minutes to 30 hours, preferably 4 minutes to 12 hours.

Drying is preferably carried out also at temperatures above 60° C., in particular at temperatures in the range of 65° to 200° C., advantageously 95° to 190° C., more preferably 100° to 140° C. in particular for long time drying (i.e. >1 hour, especially 2 to 30 hours), respectively 130° to 190° C., preferably 145° to 190° C. for short time drying (i.e. ≦1 hour, especially 2 minutes to 30 minutes). According to a particularly practical feature the reaction mixture is dried practically at the same temperature at which the reaction has been carried out ±20°, preferably ±10°. The drying can be carried out by means of conventional drying systems and apparatuses (in particular evaporators), e.g. by spray-drying or film-drying (e.g. on conveyor belts—heated e.g. with infrared radiation, microwaves or other systems—or on drying drums—heated e.g. with steam or fitted with a heated jacket), and the dried product may if desired be further comminuted to the desired particle size, to give the dry reduced hydrosoluble product e.g. in the form of granules, powder or scales.

Where, according to the preferred feature, the reaction is carried out at least in part simultaneously with the evaporation (drying) of the aqueous mixture the total time required therefor will depend on the employed drying system, the employed temperature, the consistency of the mass and its depth and may vary broadly, e.g. in the range of 4 minutes to 30 hours, preferably 5 minutes to 12 hours. Thus with continuous systems such as film drying on conveyor belts or drying drums or by spray drying, the drying time, and in particular even the whole time required for the process of the invention, may be as low as 4 to 30 minutes, preferably in the range of 5 to 20 minutes. Preferably the reaction mixture is directly dried so that the reduction reaction takes place during the evaporation of the water to directly obtain in one process step the reduced and dried product.

As a dry product, in particular as a dry product (L), there is meant a solid leuco sulphur dye as obtainable by a drying procedure as described, especially with a water content ≦5% by weight, preferably ≦2% by weight of the product.

By the described process it is possible to obtain in a very simple way and without the addition of other reactants (in particular in the absence of any added sulphide) and assistants (in particular in the absence of any surfactants) stabilized leuco sulphur dyes (L) of high concentration which are practically free of sulphide ions, in particular in which the inorganic sulphide content of the dry product is below 1% by weight, more particularly even below 0.2% by weight, it being possible to obtain products that are free of inorganic sulphides (as detectable by normal analytical methods with a sensitivity of 0.01%) and which in the presence of acids do not develop any organoleptically perceivable $H_2S$. Further the obtained dyes (L) have a notable stability against atmospheric oxidation in their solid form or also in liquid form, in particular also in the form of aqueous stock solutions (as are usually prepared before dyeing).

The obtained dried leuco sulphur dyes (L) are readily hydrosoluble and can be formulated to liquid, in particular aqueous, compositions by plain dilution with water, there being obtainable aqueous solutions even of high concentration, in particular of a concentration of $\geq 5\%$ by weight of (L) up to the saturation concentration. For the formulation of concentrated compositions, e.g. containing 5 to 50, preferably 10 to 40% by weight of (L), it may also be of advantage to add formulation additions, in particular solubilizers and/or hydrotropics, e.g. urea, mono-, di- or triethylene glycol $C_{1-4}$-alkylmonoether, mono-, di- or tripropylene glycol $C_{1-4}$-alkylmonoether, mono-, di- or triethanolamine or mono-, di- or triisopropanolamine, and/or anionic surfactants, e.g. sulpho group-containing surfactants with 6 to 24 carbon atoms in the lipophilic radicals (e.g. sodium xylenesulphonate, lignin sulphonate or dinaphthylmethane disulphonate), and/or reduction stabilizers (which may e.g. be selected among conventional sulphide-free redox products, such as thiourea dioxide).

Such liquid compositions—in particular those of products (L) obtained in the presence of (C)—are very stable and their tendency to form by air-oxidation a disturbing surface film, even when they are diluted with water to stock solutions before dyeing, is also substantially reduced, so that the liquid concentrated compositions can be shipped and/or stored for several days or weeks without any disturbing alteration of the composition and the stock solutions can be prepared and stored as suitable before dyeing, without any disturbing alteration, in particular without formation of a disturbing oxidation film on the surface of the solution.

The obtained stabilized leuco sulphur dyes (L) may presumably be regarded as (hemi)mercaptals of the reducing carbonyl compounds (A) (or of corresponding reductones), i.e. as leucosulphur dyes in which at least some of the thiol or thiolate groups have reacted with the reducing carbonyl group to give a corresponding (hemi)mercaptal, which is stabilized during the drying process rendering the dye stable to air oxidation and to inner dismutation.

The products (L) obtainable by means of the process of the invention are hydrosoluble dyes of low affinity and are suitable for the dyeing of textile or non-textile substrates dyeable with sulphur dyes; those obtained in the presence of (C) excel by their particularly good hydrosolubility and stability also in pre-diluted form (in particular as stocksolutions), those obtained in the absence of (C) are particularly suitable also for the dyeing of paper. They are suitably applied on the substrate in their leuco-form and then e.g. oxidized on the substrate to give the corresponding oxidized form (which process is particularly suitable for the dyeing of cellulosic textile material) or fixed in another way, e.g. by precipitation on the substrate (especially when sizing the substrate) resp. bonding to the size which is fixed to the substrate—in particular for sized textiles, bonded non-wovens or sized paper.

As materials dyeable with the dyes of the invention from aqueous medium with subsequent oxidation or other fixation of the dye there may be mentioned in particular fibrous materials, principally cellulosic material and natural or synthetic polyamides (e.g. wool, leather, synthetic polyamides). The fibrous substrate may be in any form as conventionally employed for dyeing, e.g. as loose fibres, filaments, yarns, skeins, hanks, bobbins, non-wovens, felts, woven or knitted goods, carpets, velvets, tuftings as well as half ready-made or ready-made goods. The dye may be applied by any method conventional per se in the art, e.g. by exhaust methods (from short or long liquors, e.g. at liquor-to-goods ratios in the range of 2:1 to 120:1, preferably 10:1 to 40:1) or by impregnation methods (e.g. by padding, dipping, spraying, foam application or printing). The dye-liquors may also contain additives in particular as conventional in the art, e.g. wetting agents, levelling agents, metal-sequestering agents, build-up adjuvants, reducing agents and/or further additives deriving e.g. from the use of the dyes in the form of a liquid formulation in particular as described above. Advantageously the dye-liquor contains a sulphide-free reducing agent, e.g. formaldehyde sulphoxylate, thiourea dioxide, sodium or potassium hydrosulphite or a carbonyl compound preferably as defined above for (A), in particular hydroxyacetone or a reducing mono- or oligosaccharide, preferably glucose; the reducing compound is present in the dyeing liquor advantageously in a concentration of 5 to 100, preferably 10 to 80% by weight, referred to the dye. For the impregnation the liquor may, if desired, further contain a thickening agent.

Exhaust dyeing may take place at conventional temperatures, on textile material in particular in the range of 60° to 140° C. if required under superatmospheric pressure, on cellulosic textile material and/or on synthetic polyamide textile material advantageously at temperatures in the range of 90° to 135° C., e.g under HT-conditions (preferably 102° to 130° C.) or preferably at 90° C. to the boil, in particular at 95° C. to the boil, and under neutral to basic pH-conditions (preferably pH $\geq 7.5$, more preferably $\geq 12$, e.g. at pH 12 to 14), preferably with addition of a reducing agent as indicated above and suitably together with the adequate quantity of alkali metal hydroxide, particularly NaOH, and advantageously an inorganic hydrosoluble salt as conventionally employed in exhaust dyeing, e.g. sodium chloride, sodium sulphate or sodium carbonate, in order to favour build-up.

For impregnation the impregnation liquors may be of an analogous composition as the exhaust dyeing liquors and in a concentration as suitable for the selected application and may further contain additives as suitable for the respective impregnation method, e.g. thickeners. The impregnated goods may be fixed by conventional means e.g. by heating, preferably to temperatures $\geq 100°$ C., e.g. with dry heat, e.g. at 130° to 180° C., or preferably by steaming, e.g. at 100° to 105° C.

The dyeing is expediently concluded by fixation of the dye, mainly by oxidation or in another way. Oxidation may be carried out with conventional oxidizing agents, e.g. with air, oxygen, peroxides or oxidizing halogen compounds (e.g. alkali metal bromates, iodates, chlorates or chlorites), at pH conditions in the range from acidic to alkaline, preferably at a pH in the range of 4 to 8, in particular 4.5–7.5 when oxidizing with halogenates, peroxides, oxygen or air, or under alkaline conditions, in particular at a pH in the range of 8 to 11, more preferably 9 to 10.5 when oxidizing with an alkali metal halogenite, especially sodium chlorite. Peroxides, in particular $H_2O_2$, may also be employed under alkaline conditions. Since tap water or (partially) demineralized water as conventionally employed in dyeing plants contains some dissolved oxygen, oxidation may also be achieved by rinsing with correspondingly large amounts of water.

The fixation of the dye in another way than by oxidation may take place e.g. by precipitation with or bonding to a suitable agent employed as a fixing agent or finishing resin e.g. on textiles or non-wovens, or as a flocculating, de-watering or retention agent and/or as a size in paper production, in particular calcium or aluminium salts—preferably aluminium sulphate—(which is particularly suitable for the dyeing of paper).

Paper is suitably dyed in the mass, preferably in the form of aqueous paper stuff suspension, advantageously at temperatures in the range of 15° to 40° C. (the simplest at ambient temperature) and preferably at pH values in the range of 8 to 11 [in particular as may result by dissolving an alkali metal hydroxide-containing dye (L) or a stock solution thereof in the liquor]. The dye may then be precipitated on the fibre or bonded e.g to a size by addition of a suitable size and/or a de-watering or retention agent, preferably under weakly acidic conditions, in particular at a pH in the range of 4.5 to 6.5.

There are obtainable dyeings of optimum yield and fastnesses. During the dyeing the soiling of the dyeing-machines is reduced to a minimum. With the use of the leuco sulphur dyes (L) of the invention a disturbing hydrogen sulphide development and/or a disturbing inorganic sulphide occurrence in the waste water of the dyeing may efficiently be avoided.

In the following examples the percentages are by weight and the temperatures are in degrees Celsius. The hydrosolubility of the products is tested by the following method: Prepare 100 ml of a 5% solution of the reduction product in demineralized water at 20° C., stirring until the product is completely dissolved (which takes about 5 minutes), and filter by means of suction through a paper filter Schleicher & Schell 589/2 of 7 cm of diameter; filtration of a readily and completely dissolved product takes place in a few seconds and leaves no undissolved residue on the filter.

The sulphide content of the product may be determined by acidifying 100 ml of a 1% w/w solution of the product in distilled water placed in a first vessel with 2 ml of 80% acetic acid, collecting any developed $H_2S$ with the aid of a $CO_2$ or $N_2$ stream, passed through the solution placed in the first vessel, into one or more further vessels that contain a liquid suitable for binding the $H_2S$ (e.g. an aqueous metal oxide or hydroxide or heavy metal salt solution) in which the sulphide may then be analyzed in conventional way.

EXAMPLE 1 a) 200 g of 2,4-dinitrochlorobenzene are reacted with 169 g of an aqueous 50% sodium hydroxide solution at 100° C. for 2 hours. The obtained product is added into a mixture of a solution of 200 g of sodium sulphide in 200 g of water and 127 g of sulphur and the mixture is heated to 116°–120° C. and refluxed at this temperature for 10–15 hours after which the mixture is diluted with 200 g of water and aerated by passing air through the solution until the dye is precipitated. The obtained mixture is then filtered and washed with water to give a filter cake of black dye with a water content of 40–60%.

B) This filter cake is mixed in a 1 l evaporating pan with 100 g of aqueous 50% sodium hydroxide solution and 26 g of glucose. This mixture is heated to 120°–130° C. and maintained for 12 hours at 120°–130° C. until the mixture is dry. There are obtained 260 g of dry black product (1) readily and completely soluble in water, is free of inorganic sulphides and is stable to air oxidation even in the form of a 1% aqueous solution of the product.

EXAMPLE 2

A) 200 g of 2,4-dinitrochlorobenzene are reacted with 169 g of an aqueous 50% sodium hydroxide solution at 100° C. for 2 hours. The obtained product is added into a mixture of a solution of 200 g of sodium sulphide in 200 g of water and 127 g of sulphur and the mixture is heated to 116°–120° C. and refluxed at this temperature for 10–15 hours.

B) 100 g of 50% sodium hydroxide solution and 35 g of glucose are then added and the obtained mixture is reacted and dried at 120°–130° C. in a 1 l evaporating pan during 12 hours. There are obtained 590 g of a dry black powder (2), which is readily and completely soluble in water and the sodium sulphide content of which is <0.1%.

EXAMPLES 3 AND 4

The process according to Example 1 resp. according to Example 2 is repeated, with the difference that the 2,4-dinitrochlorobenzene is replaced by a mixture of equimolar proportions of picric acid and 2,4-dinitrochlorobenzene. The obtained dry products (3) resp. (4) are readily and completely soluble in water.

EXAMPLES 1A TO 4A

The processes according to Examples 1, 2, 3 resp. 4 are repeated, with the difference that the glucose is replaced by the equivalent amount of maltose. The obtained dry products (1a), (2a), (3a) resp. (4a) are readily and completely soluble in water.

EXAMPLES 1B TO 1B

The processes according to Examples 1, 2, 3 resp. 4 are repeated, with the difference that the glucose is replaced by the equivalent amount of lactose. The obtained dry products (1b), (2b), (3b) resp. (4b) are readily and completely soluble in water.

EXAMPLES 1C TO 1C

The processes according to Examples 1, 2, 3 resp. 4 are repeated, with the difference that the glucose is replaced by the equivalent amount of xylose. The obtained dry products (1c), (2c), (3c) resp. (4c) are readily and completely soluble in water.

EXAMPLE 5

A) 200 g of the thionation reaction product obtained by reaction of sodium polysulphide and sulphonated copper phthalocyanine (4 sulpho groups) is diluted with water and oxidized with air until the dye precipitates. The mixture is neutralized with sulphuric acid to a pH of 7, then vacuum filtered and washed with water. There are obtained 560 g of filter cake of a green dye with a water content of 80–85%.

B) 250 g of this filter cake are mixed in a 1 l evaporating pan with 120 g of water, 34 g of aqueous 50% sodium hydroxide and 13.5 g of glucose and the mixture is heated to 100° C. and maintained at this temperature for 10 hours. There are obtained 60 g of a green dye powder (5) in reduced form, which contains 5% NaOH referred to the weight of the final dry product, is free of inorganic sulphides, is readily and completely soluble in water and dyes cotton in intense green shades, when applied in the presence of suitable reducing agents (e.g. glucose) and sodium hydroxide and with subsequent oxidation.

EXAMPLE 6

A) A mixture of 45 g of sulphur, 54 g of sodium sulphide 60% and 45 g of 2,4-diaminotoluene is baked in a rotary drum at 280° C. during 24 hours. The obtained solid product is dissolved in 500 g of water and 20 g of NaOH at 100° C. during 3 hours. The obtained mixture is diluted with 500 g of water and air is passed through the solution until the sulphide is oxidized and the dye is precipitated. The pH is then adjusted to 7 by addition of sulphuric acid, the obtained mixture is vacuum filtered and the presscake is washed with water.

B) The obtained filter cake (with a water content of 75–85%) is admixed with 50 g of aqueous 50% sodium hydroxide, 18 g of glucose and 50 g of water. Then the mixture is reacted and dried simultaneously at 120°–130° C. in an evaporating pan during 10 hours. There are obtained 110 g of dry leuco sulphur brown (6) which is readily and completely soluble in water and that, suitably applied in the presence of a reducing agent as indicated above (e.g. glucose) and of NaOH and then oxidized, gives dyeings of deep yellowish brown shades on cotton.

EXAMPLE 7

250 g of the filter cake obtained according to Example 1 part A) are mixed with 66 g of aqueous 50% sodium hydroxide and 16 g of glucose. 20 g of this mixture are put in the form of a thin layer into an evaporating pan, heated to 165° C. and dried within 8 minutes. There are obtained 7 g of dry black product (7) readily and completely soluble in water, is free of inorganic sulphides and is stable to air oxidation even in the form of a 1% aqueous solution of the product.

The respective filter cakes of Examples 5 a) and 6 a) and the refluxed mixture of Example 2 A) can be reduced and dried in an analogous way as described in Example 7 for the filter cake of Example 1 A).

EXAMPLE 8

The filter cake obtained according to Example 1 part A) is mixed in A 1 l evaporating pan with 120 g of aqueous 50% sodium hydroxide solution, 28 g of glucose and 28 g of sodium bisulphite. This mixture is heated to 120°–140° C. and maintained for 8 hours at 120°–140° C. until the mixture is dry. There are obtained 300 g of a black solid reduced product (8) which is readily and completely soluble in water, is free of inorganic sulphides and is stable to air oxidation even in the form of a 1% aqueous solution of the product.

EXAMPLE 9

120 g of 50% sodium hydroxide, 35 g of glucose and 25 g of sodium bisulphite are added to the product obtained according to Example 2 part A) and the obtained mixture is reacted and dried at 120°–130° C. in a 1 l evaporating pan during 12 hours. There are obtained 626 g of a dry black powder (9), which is readily and completely soluble in water and the sodium sulphide content of which is <0.1%.

EXAMPLES 10 AND 11

The processes according to Example 8 resp. according to Example 9 are repeated, with the difference that the 2,4-dinitrochlorobenzene is replaced by a mixture of equimolar proportions of picric acid and 2,4-dinitrochlorobenzene. The obtained dry products (10) resp. (11) are readily and completely soluble in water.

EXAMPLES 8A TO 11A

The processes according to Examples 8, 9, 10 and 11 are repeated, with the difference that the glucose is replaced by the equivalent amount of maltose. The obtained dry products (8a), (9a), (10a) resp. (11a) are readily and completely soluble in water.

EXAMPLES 8B TO 11B

The processes according to Examples 8, 9, 10 and 11 are repeated, with the difference that the glucose is replaced by the equivalent amount of lactose. The obtained dry products (8b), (9b), (10b) resp. (11b) are readily and completely soluble in water.

EXAMPLES 8C TO 11C

The processes according to Examples 8, 9, 10 and 11 are repeated, with the difference that the glucose is replaced by the equivalent amount of xylose. The obtained dry products (8c), (9c), (10c) resp. (11c) are readily and completely soluble in water.

EXAMPLE 12

250 g of the filter cake obtained according to Example 5 part A) are mixed in a 1 l evaporating pan with 120 g of water, 44 g of aqueous 50% sodium hydroxide, 13.5 g of sodium bisulphite and 13.5 g of glucose and the mixture is heated to 100° C. and maintained at this temperature for 10 hours. There are obtained 72 g of a green dye powder (12) in reduced form, which contains 5% NaOH referred to the weight of the final dry product, is free of inorganic sulphides, is readily and completely soluble in water and dyes cotton in intense green shades, when applied in the presence of suitable reducing agents (e.g. glucose) and sodium hydroxide and with subsequent oxidation.

EXAMPLE 13 a) A mixture of 140 g of sulphur and 45 g of 2,4-diaminotoluene is baked at 300° C. in a rotary drum for 24 hours. The obtained solid product is dissolved in 200 g of water and 150 g of NaOH at the boil during 2–4 hours. The obtained mixture is diluted with 800 g of water and air is passed through the solution until the sulphide is oxidized and the dye is precipitated. The pH is then adjusted to 7 by addition of sulphuric acid, the obtained mixture is vacuum filtered and the presscake is washed with water.

b) The obtained filter cake (with a water content of 75–85%) is admixed with 60 g of aqueous 50% sodium hydroxide, 18 g of glucose and 15 g of sodium bisulphite. Then the mixture is reacted and dried simultaneously at 120°–130° C. in an evaporating pan during 10 hours. There are obtained 130 g of dry leuco sulphur orange (13) which is readily and completely soluble in water and that, suitably applied in the presence of a reducing agent as indicated above and of NaOH and then oxidized, gives dyeings of deep yellowish orange shades on cotton.

EXAMPLE 14

250 g of the filter cake obtained according to Example 1 part A) are mixed with 64 g of aqueous 50% sodium hydroxide, 15 g of glucose and 16 g of sodium bisulphite. 28 g of this mixture are put in the form of a thin layer into an evaporating pan, heated to 150°–160° C. and dried within 10 minutes. There are obtained 7 g of dry black product (14) which is readily and completely soluble in water, is free of inorganic sulphides and is stable to air oxidation even in the form of a 1% aqueous solution of the product.

The respective filter cakes of Examples 5 A) and 6 A) and the refluxed mixture of Example 2 A) can be reduced and dried in an analogous way as described in Example 14 for the filter cake of Example 1 A).

COMPOSITION 1

50 g of the dry product (1) obtained according to Example 1 are dissolved in 210 g of water, together with 66 g of urea, 10 g of diethylenglycol monoethylether and 10 g of aqueous 40% sodium xylene sulphonate and heated to 70° C. during 20–30 minutes, cooled to 40° C. and treated with 10 g of monoethanolamine and 2.5 g of thiourea dioxide. There is obtained a good solution of the reduced dye, which is free of sulphides and polysulphides and has a high stability to oxidation and film-formation and further has a low affinity for cotton; by applying the leuco dye on cotton in the presence of a suitable reducing agent as indicated above (e.g. glucose) and of sodium hydroxide and with subsequent oxidation there may be obtained deep black cotton dyeings of optimum fastnesses.

COMPOSITIONS 7, 8 AND 14

The procedure described for Composition 1 is repeated, with the difference that in place of 50 g of product (1) there are employed 50 g of product (7), (8) or (14). There are obtained good solutions of the respective reduced dyes, which are free of sulphides and polysulphides and have a high stability to oxidation and film-formation and further have a low affinity for cotton; by applying the leuco dyes on cotton in the presence of a suitable reducing agent as indicated above (e.g. glucose) and of sodium hydroxide and with subsequent oxidation there may be obtained deep black cotton dyeings of optimum fastnesses.

COMPOSITIONS 2, 3, 4, 5, 6, 9, 10, 11, 12 AND 13

The procedure described for Composition 1 is repeated, with the difference that in place of product (1) there are employed the products (2), (3), (4), (5), (6), (9), (10), (11), (12)and (13)respectively, in amounts corresponding to the respective solubilities.

APPLICATION EXAMPLE A 5 g of the leuco sulphur dye powder (1) obtained according to Example 1 are dissolved in 60 ml of water, containing 0.1 g of EDTA (ethylene diamine tetraacetic acid sodium salt) and 0.1 g of a commercial wetting agent (alkylphosphate). 2.5 g of dextrose and 2.0 g of aqueous 50% sodium hydroxide solution are then added thereto and the obtained mixture is diluted with cold water up to a total volume of 100 ml. A cotton fabric of 50 cm×8 cm with a weight of 10 g is padded with this liquor to a pick-up of 100% and then steamed for one minute at 102° C. The steamed fabric is then rinsed with water and oxidized during one minute in a solution of 7 g/l of 30% hydrogen peroxide and 7 g/l of 80% acetic acid at 50° C. Finally the treated fabric is dried. There is obtained a deep black dyeing with good fastnesses to washing, rubbing and light. After the dyeing procedure the machine used for the dyeing is much cleaner than after a dyeing obtained in the same way but with a sodium sulphide-containing dye obtained in conventional known manner.

APPLICATION EXAMPLES AA TO AC

Application Example A is repeated with the difference that in place of the leuco sulphur dye powder (1) there is employed the leuco sulphur dye powder (7), (8) or (14). There are obtained deep black dyeings with good fastnesses to washing, rubbing and light. After the dyeing procedure the machine used for the dyeing is much cleaner than after a dyeing obtained in the same way but with a sodium sulphide-containing dye obtained in conventional known manner.

APPLICATION EXAMPLE B 1 g of the dry leuco sulphur dye powder (1) obtained according to Example 1 is added into a solution of 200 ml of water, 0.2 g of EDTA, 0.2 g of wetting agent (as used in Application Example A), 0.8 g of dextrose and 0.8 g of 50% sodium hydroxide solution and stirred until the dye is dissolved. A cotton skein of 10 g is introduced into this liquor and the bath is heated during 15 minutes to 95° C., while continuously moving the skein, and then maintained for 20 minutes at this temperature. 8 g of sodium chloride are then added and dyeing is continued for further 30 minutes at 95° C., after which the treated skein is taken out from the bath, washed with water and treated during 15 minutes with a solution of 0.5 g/l of hydrogen peroxide and 0.5 g/l of acetic acid at 50° C. for oxidation of the dye. Upon oxidation the skein is washed and dried. There is obtained a deep black dyeing of good fastnesses.

APPLICATION EXAMPLE BA TO BC

Application Example B is repeated with the difference that in place of the leuco sulphur dye powder (1) there is employed the leuco sulphur dye powder (7), (8) or (14). There are obtained deep black dyeings of good fastnesses.

Analogously as the leuco sulphur dye powders (1), (7), (8) and (14) according to Examples 1, 7, 8 and 14 the leuco sulphur dye powders (2), (3), (4), (5), (6), (1a), (2a), (3a), (4a), (1b), (2b), (3b), (4b), (1c), (2c), (3c), (4c) (9), (10), (11), (12), (13), (8a), (9a), (10), (11a), (8b), (9b), (10b), (11b), (8c), (9c), (10c) and (11c) may be employed in Application Examples A and B giving dyeings of corresponding shades. In place of the dry powders there may be employed the corresponding liquid formulations Compositions 1 to 14.

APPLICATION EXAMPLE C 0.5 g of the black leuco sulphur dye powder (1) obtained according to Example 1 are given with stirring into 500 ml of a 1% paper stuff suspension. After 10 minutes 0.1 g of rosin size (sodium rosinate) and a sufficient amount of aluminium sulphate to give a pH of 4.5 to 5.0 are added, by which the dye is precipitated on the paper stuff. A paper sheet is formed of the dyed paper stuff. The paper is dyed in a deep black, the drained liquor is completely transparent, colourless and free of inorganic sulphides.

Analogously as the leuco sulphur dye powder (1) according to Example 1, the leuco sulphur dye powders (2), (3), (4), (5), (6), (7), (1a), (2a), (3a), (4a), (1b), (2b), (3b), (4b), (1c), (2c), (3c) and (4c) may be employed in Application Example C giving paper dyeings of corresponding shades. In place of the dry powders there may be employed the corresponding liquid formulations Compositions 1 to 7.

The part of the invention comprising further or/and particularly selected matter which forms the subject matter added by the continuation in part application is included in the following description and examples:

It has now been found that the drying, and preferably the reaction and the drying, can be carried out in a very short time, below 4 minutes, in particular in a time of some seconds, if the reaction mixture is dried by spray-drying, especially with hot gases.

The invention thus further relates to the defined spray-drying process, to the respective dry product and its use in dyeing.

The invention thus provides a process for the production of a hydrosoluble dry leuco sulphur dye (L) wherein a sulphur dye (S) is reacted in aqueous medium and at a temperature above 60° C., with
an efficient amount of (A) a reducing carbonyl compound
in the presence of (B) an alkali metal hydroxide
and optionally (C) an alkali metal sulphite and/or bisulphite and dried, wherein the drying is carried out by spray-drying in a drying time <4 minutes.

Components (S), (A), (B) and (C) and their relative quantities and, if the reaction and the drying are carried out separately, also the reaction conditions are as defined above. (S) may be any commercially available sulphur dye or also an optionally oxidized or/and acidified thionation reaction product, preferably in the form of a wet, preferably washed, filter cake. (A) is in particular a monomeric or oligomeric keto- or aldo-saccharide or hydroxyacetone, preferably a monomeric aldopentose or -hexose. As (B) and (C) there may be employed in particular the respective lithium, sodium or potassium compounds, among which the sodium compounds are preferred. (A) is preferably employed in a quantity in the range of 1 to 40%, more preferably 5 to 15% by weight referred to the weight of (L); the weight ratio (A)/(S) is preferably in the range of 5/100 to 40/100, more preferably 10/100 to 20/100. The weight ratio (B)/(S) is preferably such that an excess of (B) is present in the final product, preferably 0.5 to 20, more preferably 3 to 10% by weight referred to the weight of (L). (C) is advantageously employed in a quantity in the range of 1 to 40%, preferably 2 to 24%, more preferably 5 to 10% by weight referred to the weight of (L); the weight ratio (C)/(S) is preferably in the range of 5/100 to 40/100, more preferably 10/100 to 20/100. The weight ratio (A)/(C) is preferably in the range of 1/5 to 5/1, more preferably 2/1 to 1/2. The amount of water in the composition to be dried, i.e. the total water content of the reaction mixture at the beginning of the drying, is conveniently at least such that the mixture is easily sprayable and the aqueous phase represents the continuous phase, and is advantageously ≦95% by weight, preferably 10 to 90% by weight, more preferably 20 to 80% by weight.

The drying can be carried out by any spray-drying systems conventional per se, e.g. by spray-freeze-drying (if the reaction has been completed before the drying) or preferably with hot gases (G).

As gases (G) come suitably into consideration gases that are substantially inert to (L) under spray-drying conditions, i.e. such gases that do not cause a substantial chemical modification of the product (L) during spray-drying. As (G) come into consideration e.g. nitrogen, superheated steam or/and air. For the production of leuco sulphur dyes (L) that are readily oxidizable with hot air the gas is preferably a substantially oxygen-free inert gas, preferably nitrogen or also a blend of air with nitrogen; for leuco sulphur dyes (L) that are more resistant to air oxidation, e.g. those with a higher threshold of incipient oxidation with hot air, so as not to be impaired by the short hot-air-treatment in the spray-drier [e.g. such as the dyes (L) corresponding to Colour Index Leuco Sulphur Black 1 and 2], hot air may be used as the hot gas (G). The use of hot air—where suitable—is generally preferred for economical reasons; its suitability for a given dye (S) resp. (L) in spray-drying may be ascertained by means of a few preliminary tests. Most preferably (G) is nitrogen.

With particular advantage the drying is carried out with hot gases (G) at least in part simultaneously with the reduction reaction; most preferably the reduction reaction and the drying are carried out simultaneously, so that the water content of the reaction mixture corresponds to the water content of the mixture to be dried.

The drying may be carried out at temperatures in the ranges indicated above or even at higher temperatures, depending on the drying system in the spray-drier. The inlet temperature of the hot gas (G) into the drier [i.e. the temperature at which (G) is fed into the spray-drier] may be within ranges per se conventionally operative, in particular >70° C., advantageously ≧105° C., preferably >150° C.; the upper limit of the inlet temperature of (G) is mainly dictated by the feature and size of the drier and is advantageously ≦300° C., preferably ≦280° C. A preferred range for the inlet temperature of (G) into the spray-drier is 150° to 300° C., especially 165° to 300° C. Preferably (G) is fed into the drier at such temperatures that the drying takes place at (G)-temperatures above the boiling temperature of water, in particular within the range of 105° to 300° C., most preferably in the range of 150° to 280° C., especially ≧200° C.

The gas (G) is fed into the drier at a suitable superatmospheric pressure, e.g. in the range of 2 to 50, preferably 2.5 to 25, more preferably 3 to 12 kg/cm$^2$.

The mixture to be dried is preferably fed into the spray-drier at elevated temperatures, which are expediently below the boiling temperature of the mixture, preferably in the range of 50° to 100° C., advantageously 70° to 98° C., most preferably 85° to 98° C. The drying in the spray-drier is suitably carried out under such conditions and with such parameters that the temperature of the outlet gas (G) [i.e. the temperature at which (G) leaves the spray-drier] is advantageously in the range of 60° to 180° C., preferably 100° to 150° C., for hot air and/or nitrogen, or 105° to 250° C., preferably 150° to 240° C., for superheated steam. The drier is suitably worked in such a way that the reaction mixture is subjected to a substantial temperature increase during the trajectory of the sprayed particles in the drier and the dried particles leave the drier at the outlet at a temperature that is preferably by 10° to 60° centigrade, more preferably by 15° to 40° centigrade, higher than the temperature at which the mixture to be dried has been fed into the drier.

The spray-driers may be such as conventionally available for spray-drying, in particular such in which the liquid composition to be spray-dried is sprayed into the drier by atomization, in particular nozzle atomization, rotary atomization or sonic atomization. The hot gas (G) may be led in con-current or counter-current to the sprayed particles. According to one preferred way of working spray-drying is carried out by injection atomization. Another preferred way is represented by rotary atomization, especially vertical rotary atomization (e.g. also by means of a turbine).

The nozzles or other supplying devices (e.g. cups, discs, turbines) for spraying the composition into the drier will expediently be chosen in such a way as to suit the composition introduced. In particular, where the composition to be sprayed is an (S)-containing dispersion, the kind, shape and size of the spraying device will be chosen so as to suit the dispersion to be sprayed. According to a preferred feature of the process the (S)-containing aqueous composition—in particular containing the sulphur dye (S) not yet reduced with (A), advantageously in the presence of at least a part of (B)—is pre-heated, preferably in the absence of (A) and (C), to a suitable temperature in order to render it more fluid or liquid for spraying. Suitable temperatures for this are $\leq 100°$ C. in particular in the range of 50° to 98° C., preferably 60° to 95° C. This is advantageously done in such a way that in this stage (S) does not yet react to (L) to a substantial degree, but is just solubilized with (B). Suitably (A) and optionally (C) are admixed with the pre-heated aqueous mixture of (S) and (B) [in which (S) is preferably solubilized with (B)] immediately before feeding it into the spray-drier.

The drying time, in particular reaction and drying time, is advantageously <2 minutes, preferably in the range of 1 to 60 seconds, more preferably in the range of 2 to 30 seconds. The feeding rate of the composition to be dried, in particular reacted and dried, will suitably depend on the other parameters and on the water content of the composition and may be e.g. in the range of 100 to 10,000, preferably 200 to 5000 l/h, e.g. about 4 m$^3$/h, depending also on the capacity of the drier.

If according to the preferred mode reaction and spray-drying in hot gas (G) are carried out at least in part simultaneously—more preferably so that the not yet reacted mixture of the reactants is sprayed into the drier and the reduction reaction takes place substantially completely in the drier—, the reaction of (S) with (A) in the presence of (B) and optionally (C) takes place in each sprayed particle during the drying trajectory of the sprayed droplet, to give in a few seconds a dried particle of hydrosoluble leuco sulphur dye (L). In particular, if according to the preferred mode the composition contains unreacted sulphur dye (S), during the drying trajectory of the particle through the hot gas (G) the sulphur dye (S) is gradually transformed into the more soluble reaction product (L), which is at least in part dissolved in the water present in the particle; the water is however evaporated during the drying trajectory, so that, while at the exterior of the particle an enrichment in (L) takes place during drying, in the inner of the particle the still present water promotes the further reaction of any still present (S), and at the end of the drying of the particle the reaction of (S) to (L) in each particle is practically complete.

The reaction takes place in a surprisingly complete way and the obtained product is a particulate hydrosoluble dry leuco sulphur dye (L), preferably in pourable particle size.

As a dry product, in particular as a dry product (L), there is meant a solid leuco sulphur dye as obtainable by a drying procedure as described, especially with a water content $\leq 5\%$ by weight, preferably $\leq 2\%$ by weight, referred to the weight of the product (L), more preferably with $\leq 0.5\%$ by weight of residual humidity.

Depending on the system and construction of the spray-drier and on the employed working parameters, the obtained dried particles may be in corresponding shape, size and consistency, e.g. in the form of rigid porous particles or/and hollow particles or/and crushed particles or/and collapsed particles or flakes or other forms. Depending on the construction and working conditions of the spray-drier the dried product may be obtained in various sizes, in particular in the range of 1 µm to 2 mm, for instance in the preferred atomizer systems mainly in the range 1 to 20 µm. If the dried product is of very fine size, in particular a fine powder of a particle size $\leq 5$ µm or even $\leq 10$ µm, it may be of advantage to conglomerate it to particle-agglomerates of larger size, preferably in the range of 0.01 to 10 mm, more preferably 0.01 to 4 mm, especially 0.05 to 4 mm, advantageously so that a substantially non-dusting product is obtained, e.g. in the form of flakes or granules most preferably of a size in the range of 0.2 to 2 mm.

A suitable conglomerating system may, if desired, be directly fitted or joined at the outlet of the drier, so that the fine powder is directly fed into the conglomerating apparatus. This may be any conventional suitable system, e.g. a mixer, a granulator, a spheronizer or any other system suitable for providing particles in the desired size. For the conglomerating of fine powders into larger particles there may be used suitable, preferably non-aqueous, hydrosoluble additives, in particular as conventionally known as anti-dusting additives, such as glycerine, $C_{2-4}$-alkylene glycols, oligo-($C_{2-4}$-alkylene)-glycol-ethers and their $C_{1-4}$-alkyl-monoethers, preferably mono- or dipropyleneglycol monomethylether. These anti-dusting additives may be used in very small quantities, in particular in quantities in the range of 0.5 to 8, preferably 1 to 4 parts by weight of anti-dusting additive for every 100 parts by weight of (L). The choice of an optimum quantity may vary depending on the size and shape of the powder particles and on the desired size and consistency of the conglomerated product and further also on the employed system.

For a subsequent conglomeration in particular with an antidusting additive the dried powder at the outlet of the spray-drier is preferably allowed to cool to a temperature <100° C., e.g. in the range of 50° to 100° C. or even less, in particular as suitable for the respective apparatus and additive.

The obtained dried products (L) are practically free of inorganic sulphide and stable towards air-oxidation; they are further very rapidly soluble in water, even at temperatures $\leq 40°$ C., e.g. at temperatures in the range of 5° to 25° C., so that they are well suitable for direct use in dyeing, even for low temperature dyeing processes, and for the preparation of stock solutions.

The leuco sulphur dyes (L) obtained according to the invention are suitable for dyeing any substrates dyeable with sulphur dyes using the leuco form of the sulphur dye, in particular cellulosic substrates, and further, due to the absence of sulphide and good solubility, also for the dyeing of polyamidic, in particular fibrous, substrates, e.g. of synthetic polyamides, wool and leather (e.g. also wool-bearing skins), of which wool is particularly preferred. The dyeing may be carried out by methods conventional per se, in particular by impregnation with (L)-containing impregnation-compositions, advantageously with heat-treatment (e.g. with superheated steam) of the impregnated substrate and conclusive oxidation of the dyeing from the leuco-stage to the sulphur-dye stage, or by exhaustion from (L)-containing liquors, advantageously in the presence of added electrolyte e.g. sodium sulphate, and conclusive oxidation of the dyeing from the leuco-stage to the sulphur-dye stage. The dyeing liquors advantageously contain also an anti-oxidation additive, such as a reducing sugar, hydroxyacetone, thioureadioxide, sodium hydrosulphite or/and formaldehyde sulphoxylate. The dyeing of the polyamidic substrate may be carried out in aqueous medium, under weakly acidic to weakly basic conditions, e.g. at pH values in the range of 6 to 8.5, preferably at pH-values in the range of 6.5 to 8.5, under suitable temperature conditions, advantageously at temperatures below 100° C., preferably in the range of 40° to 90° C., especially 70° to 85° C.; after washing and optionally rinsing, the leuco form may be oxidized on the substrate to the sulphur dye form by means of a treatment with an oxidizing agent, preferably with $H_2O_2$, under weakly acidic conditions (e.g. with acetic acid), at temperatures preferably in the range of 30° to 60° C., more preferably 35° to 50° C., for a short time, e.g 10 seconds to 10 minutes, preferably 30 seconds to 4 minutes, as required for the respective substrate and dyeing. The leuco sulphur dye (L) may be used in any concentrations as suitable for the respective substrate and desired colour intensities. With the leuco sulphur dyes (L) there may e.g. be obtained aqueous solutions in concentrations up to 50–100 g/l or even more.

There may be obtained dyeings of intensive shades and notable fastnesses, especially light fastness and wet fastnesses.

Since the dried products (L) are substantially free of inorganic sulphides, no disturbing, organoleptically perceivable $H_2S$ is evolved during dyeing. The exhausted mother liquors may be recycled for a further dyeing or/and in residual liquors (e.g. from washing and rinsing) residual (L) may be precipitated and separated in a manner known per se, e.g. by desolubilization with polyvalent metal ions or with mineral acids.

The stock solutions are stable for several hours without the formation of a disturbing oxidation film. The dyeing processes can be carried out with substantially no occurrance of any disturbing oxidation deposits in the dyeing machines.

The following Examples, in which the percentages are by weight and the temperatures are in degrees Celsius, illustrate the invention.

EXAMPLE 15

200 g of 2,4-dinitrochlorobenzene are reacted with 169 g of an aqueous 50% sodium hydroxide solution at 100° C. for two hours. The obtained product is added into a mixture of a solution of 200 g of sodium sulphide in 200 g of water and 127 g of sulphur and the mixture is heated to 116°–120° C. and refluxed at this temperature for 10–15 hours, after which the mixture is diluted with 200 g of water and aerated by passing air through the solution until the dye is precipitated. The obtained mixture is then filtered and washed with water to give a filter cake of a black dye with a water content of 40–60%. The obtained filter cake is mixed with 120 g of aqueous 50% sodium hydroxide, this mixture is heated to 90° C. and 28 g of glucose and 28 g of sodium bisulphite are added thereto and the obtained mixture is immediately injected into a hot air spray-drier through injection atomizer nozzles at a feed ratio of 445 liter/hour; the air is introduced at a superatmospheric pressure of 4–7 kg/cm$^2$ and at a temperature of 165° C. The outlet air is of 118° C. The drying is complete after 5–15 seconds and the temperature of the dried product at the outlet is 105°–110° C. The product leaving the drier is a fine powder of a particle size of 5–10 μm.

EXAMPLE 16

Example 15 is repeated with the hundredfold quantity (in particular of the components and of the feed ratio) under industrial scale working conditions, in which the inlet air temperature is of 220° C. and the outlet air is of 120° C.

EXAMPLE 17

Example 16 is repeated, with the difference that as hot gas (G) there is used hot nitrogen instead of hot air.

EXAMPLE 18

Example 17 is repeated with the difference that the nitrogen-inlet temperature is 280° C. and the nitrogen-outlet temperature is 105° C.

EXAMPLE 19

Example 17 is repeated with the difference that the nitrogen-inlet temperature is 300° C. and the nitrogen-outlet temperature is 110° C.

The reaction mixture used in the above Examples 15 to 19 is the non-dried mixture according to above Example 8.

The other non-dried mixtures exemplified in each of the above Examples 1 to 7, 9 to 14 and 8a to 11c may be dried in the same way as in the above Examples 15 to 19.

EXAMPLE 20

The powder obtained in Examples 15 to 19 is mixed with 2% of dipropylene-glycol-monomethylether in a mixer, to give particle-agglomerates of a size in the range of 0.2 to 2 mm.

All the obtained products of Examples 15 to 20 are readily soluble in water and practically free of inorganic sulphide.

APPLICATION EXAMPLE D 5 g of the dry product obtained according to Example 15 are dissolved during 5 minutes in 90 g of water and 2.5 g of glucose and 2 g of a 50% aqueous solution of caustic soda are added thereto. A piece of cotton fabric is padded with this liquor to a 100% pick-up and then it is steamed at 102° C. for 1 minute and then washed. For oxidation the fabric is treated during 1 minute at 40° C. with an aqueous solution containing 5 g/l $H_2O_2$ 30% and 5 g/l of acetic acid 80%; then it is washed and dried. There is obtained a deep black dyeing.

APPLICATION EXAMPLE E 0.7 g of the black dried product of Example 15 are dissolved in 200 g of water containing 4 g of sodium sulphate and 0.5 g of thiourea dioxide. A piece of wool fabric of 10 g is dyed in this liquor at 75°–80° C. during 1 h at pH 6.5–8.5 (adjusted with acetic acid, if necessary). Then the treated wool is washed and oxidized analogously as described in Application Example A. Finally the dyed wool is washed and dried. There is obtained a deep black wool-dyeing of notable wet and light fastness properties.

Analogously as the dried product of Example 15 the dried products of each of the above Examples 16, 17, 18, 19 or 20, or the respective products obtained by drying the non-dried mixtures exemplified in each of the above Examples 1 to 7, 9 to 14 and 8bis to 11quater by means of the drying process according to the above Example 17 or 18 is employed in the above Application Examples D and E, giving dyeings of corresponding shades and fastnesses.

I claim:

1. A process for producing a hydrosoluble dry leuco sulfur dye (L) which comprises reacting a sulfur dye (S) at a temperature of at least 120° C. with a reducing agent (A) in an aqueous mixture of (S), (A) and (B) an alkali metal hydroxide, and drying the reaction mixture at a temperature above 60° C. and without exclusion of air, said reducing agent (A) being an aliphatic carbonyl compound containing a hydroxy group, an etherified hydroxy group, an amino group or an acetylated amino group as a substituent in the alpha-position to the carbonyl group and being employed in an amount sufficient for the practically complete reduction of the sulfur dye (S).

2. A process according to claim 1 wherein the total water content of the aqueous mixture of (S), (A) and (B) at the beginning of the reaction is ≦95% by weight.

3. A process according to claim 2 wherein the aqueous mixture of (S), (A) and (B) at the beginning of the reaction has a water content of 20 to 80% by weight.

4. A process according to claim 3 wherein the drying is carried out until the leuco sulfur dye (L) has a water content ≦5% by weight.

5. A process according to claim 4 wherein the reduction reaction and the drying are carried out at temperatures in the range 145° to 190° C.

6. A process according to claim 5 which comprises reacting (S) with (A) without exclusion of air.

7. A process according to claim 5 wherein the reduction reaction and the drying are carried out at least in part simultaneously.

8. A process according to claim 1 wherein the drying is carried out a temperature of 95° to 190° C.

9. A process according to claim 8 wherein the reduction reaction and the drying are carried out at temperatures in the range 130° to 190° C.

10. A process according to claim 9 wherein the reduction reaction and the drying are carried out at temperatures in the range 145° to 190° C.

11. A process according to claim 1 which comprises reacting (S) with (A) without exclusion of air.

12. A process according to claim 1 wherein the sulfur dye (S) is employed in the form of an aqueous mass (P) which contains said sulfur dye (S).

13. A process according to claim 12 wherein (P) is an aqueous reaction mass of the production of the sulfur dye (S) having a water content of 5 to 95%.

14. A process according to claim 12 wherein (P) is a wet filter cake with a water content of 5 to 95%.

15. A process according to claim 1 wherein the reducing agent (A) is an aldo or keto sugar.

16. A process according to claim 1 wherein the drying is carried out at least in part simultaneously with the reduction reaction.

17. A process according to claim 1 wherein the reducing agent (A) is a compound of formula I or II

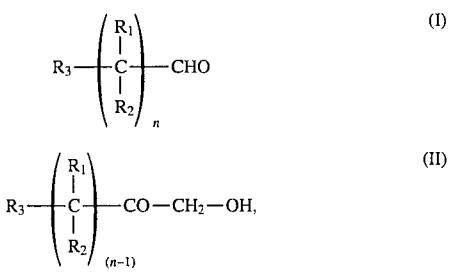

wherein one of $R_1$ and $R_2$ signifies hydrogen and the other signifies —OH, —OCH$_3$ or —NH$_2$, $R_3$ signifies —CH$_3$, —CH$_2$OH, —CHO or —COOM, M signifies hydrogen or a cation and n signifies an integer from 1 to 5.

18. A process according to claim 17 wherein the amount of reducing agent (A) is 1 to 80% based on the total weight of polymeric products in the sulfur dye (S).

19. A process according to claim 18 wherein the alkali metal hydroxide (B) is employed in such an amount that the product (L) contains 0.5 to 20% by weight unreacted (B).

20. A process according to claim 19 wherein the drying is carried at a temperature of 95° to 190° C. for a sufficient time that the water content of the leuco sulfur dye (L) is ≦5% by weight.

21. A process according to claim 19 wherein the reduction reaction and the drying are carried out as one process step such that the reduction takes place during the drying.

22. A process according to claim 21 wherein the sulfur dye (S) is one whose corresponding leuco sulfur dye is selected from the group consisting of C.I. Leuco Sulfur Blacks 1, 2, 11 and 18, C.I. Leuco Sulfur Reds 10 and 14, C.I. Leuco Sulfur Blues 3, 7, 11, 13, 15 and 20, C.I. Reduced Vat Blue 43, C.I. Leuco Sulfur Greens 2, 16, 35 and 36, C.I. Leuco Sulfur Browns 1, 3, 10, 21, 26, 31, 37, 52, 95 and 96, C.I. Leuco Sulfur Orange 1 and C.I. Leuco Sulfur Yellows 9 and 22, the reducing agent (A) is selected from the group consisting of aldopentoses and hexoses and their desoxy, disdesoxy and aminodesoxy derivatives, oligosaccharides, corn syrup, malt syrup and molasses and the alkali metal hydroxide (B) is sodium hydroxide or potassium hydroxide.

23. A process according to claim 20 wherein the reduction reaction is carried out at a temperature in the range 145° to 190° C. and the drying is carried out within 20° of the reaction temperature.

24. A process according to claim 18 wherein the amount of reducing agent (A) is 5 to 40% by weight based on the total weight of the polymeric products in the sulfur dye (S) and the water content of the reaction mixture at the beginning of the reaction is 10 to 90% by weight and the drying is carried out for a sufficient time that the water content of the leuco sulfur dye (L) is ≦2% by weight.

25. A process according to claim 1 wherein the hydrosoluble dry leuco sulfur dye (L) has an inorganic sulfide content below 1% by weight.

26. A process for the production of a hydrosoluble dry leuco sulfur dye (L) which comprises reacting a sulfur dye (S) with a reducing agent (A) in an aqueous mixture of (S), (A), (B) an alkali metal hydroxide and (C) an alkali metal sulfite or alkali metal bisulfite or mixture thereof at a temperature above 60° C. and drying the reaction mixture at a temperature above 60° C., said reducing agent (A) being an aliphatic carbonyl compound containing a hydroxy group, an etherified hydroxy group, an amino group or an acetylated amino group as a substituent in the alpha-position to the carbonyl group and being employed in an amount sufficient for the practically complete reduction of the sulfur dye (S).

27. A process according to claim 26 wherein the drying is carried out at a temperature of 95° to 190° C.

28. A process according to claim 27 wherein the drying is carried out at a temperature of 100° to 140° C.

29. A process according to claim 28 wherein the drying is effected at a temperature within 20° C. of the reaction temperature.

30. A process according to claim 26 wherein (C) is employed in an amount in the range 1 to 80% based on the weight of the polymeric material in the sulfur dye (S).

31. A process according to claim 30 wherein (A) and (C) are each employed in amounts in the range 5 to 40% by weight of the polymeric material in (S) and (B) is employed in an amount such that the dry product (L) contains 0.5 to 20%, by weight, unreacted (B).

32. A process according to claim 31 wherein the reduction reaction and the drying are carried out at temperatures in the range 145° to 190° C.

33. A process according to claim 32 wherein (A) is selected from the group consisting of aldopentoses and hexoses and their desoxy, disdesoxy and aminodesoxy derivatives, oligosaccharides, corn syrup, malt syrup and molasses, (B) is sodium hydroxide or potassium hydroxide and (C) is lithium sulfite, sodium sulfite, potassium sulfite, lithium bisulfite, sodium bisulfite, potassium bisulfite or a mixture of two or more of these.

34. A process according to claim 26 wherein (C) is lithium sulfite, sodium sulfite, potassium sulfite, lithium bisulfite, sodium bisulfite, potassium bisulfite or a mixture of two or more of these.

35. A process according to claim 26 wherein the reduction reaction or the drying or both are carried out without exclusion of air.

36. A process according to claim 26 wherein the total water content of the aqueous mixture of (S), (A), (B) and (C) at the beginning of the reaction is ≦95% by weight.

37. A process according to claim 36 wherein the aqueous mixture of (S), (A), (B) and (C) at the beginning of the reaction has a water content of 20 to 80% by weight.

38. A process according to claim 37 wherein the drying is carried out until the leuco sulfur dye (L) has a water content ≦5% by weight.

39. A process according to claim 38 wherein the reduction and the drying are carried out at temperatures in the range 130° to 190° C.

40. A process according to claim 26 wherein the reaction with the reducing agent and the drying are carried out, at least in part, simultaneously.

41. A process according to claim 26 wherein the hydrosoluble dry leuco sulfur dye (L) has an inorganic sulfide content below 1% by weight.

42. A process according to claim 41 wherein the hydrosoluble dry leuco sulfur dye (L) has an inorganic sulfide content below 0.2% by weight.

43. A process for producing hydrosoluble dry leuco sulfur dye (L) which comprises reacting a sulfur dye (S) at a temperature above 60° C. with a reducing carbonyl compound (A) in an aqueous mixture of (S), (A) and (B) an alkali metal hydroxide and drying the reaction mixture by spray drying in a drying time of less than four minutes, said compound (A) being employed in an amount sufficient for the practically complete reduction of the sulfur dye (S) and said drying being carried out, at least in part, simultaneously with the reaction of (S) with (A).

44. A process according to claim 43 wherein the reaction of (S) with (A) is carried out in the additional presence of (c) an alkali metal sulfite or alkali metal bisulfite or mixture thereof.

45. A process according to claim 44 wherein compound (A) is an aliphatic carbonyl compound containing a hydroxy group, an etherified hydroxy group, an amino group or an acetylated amino group as a substituent in the alpha-position to the carbonyl group.

46. A process according to claim 44 wherein (A) and (C) are each employed in amounts in the range 5 to 40% by weight of polymeric products in (S).

47. A process according to claim 44 wherein the reduction reaction takes place substantially completely during the spray drying.

48. A process according to claim 43 wherein the reduction reaction takes place substantially completely during the spray drying.

49. A process according to claim 43 which comprises feeding the material to be dried into a spray drier at a rate of 100 to 10,000 liters per hour.

50. A process according to claim 43 which further comprises conglomerating the spray-dried product to a particle size in the range 0.01 to 10 mm.

51. A process according to claim 43, wherein the spray-drying is accomplished with a hot gas (G).

52. A process according to claim 51, wherein the hot gas (G) is hot air or hot nitrogen.

53. A process according to claim 43, wherein the aqueous mixture is sprayed into the drier by atomization.

54. A process according to claim 51, wherein the gas (G) is introduced at a temperature >150° C.

55. A process according to claim 43, wherein the reduction reaction and the drying take place in a time <2 minutes.

56. A process according to claim 43, wherein the obtained dried particles are conglomerated to particle-agglomerates of a size in the range of 0.01 to 4 mm.

57. A process according to claim 53 wherein the aqueous mixture is fed into the spray drier at an elevated temperature which is below its boiling temperature.

58. A process according to claim 57 wherein the aqueous mixture is fed into the spray drier at a temperature in the range 70° to 98° C.

59. A process according to claim 58 wherein the aqueous mixture is fed into the spray drier at a temperature in the range 85° to 98° C.

60. A process according to claim 58 wherein the spray dried product leaves the drier in the form of particles at a temperature which is 15° to 40° centigrade higher than the temperature at which the aqueous mixture is fed into the drier.

61. A process according to claim 57 wherein the spray dried product leaves the drier in the form of particles at a temperature which is 10° to 60° centigrade higher than the temperature at which the aqueous mixture is fed into the drier.

62. A process according to claim 43 wherein the spray drying is carried out at a temperature above the boiling temperature of water.

63. A process according to claim 62 wherein the spray drying is carried out at a temperature in the range of 105° to 300° C.

64. A process according to claim 63 wherein the spray drying is carried out at a temperature in the range of 150° to 280° C.

65. A process according to claim 43 wherein the hydrosoluble dry leuco sulfur dye (L) has an inorganic sulfide content below 1% by weight.

66. A process according to claim 65 wherein the hydrosoluble dry leuco sulfur dye (L) has an inorganic sulfide content below 0.2% by weight.

* * * * *